United States Patent
Nishida et al.

(10) Patent No.: US 8,265,269 B2
(45) Date of Patent: Sep. 11, 2012

(54) RECEIVING APPARATUS AND METHOD FOR CONTROLLING THE SAME

(75) Inventors: Ryuji Nishida, Kawasaki (JP); Yoshihiro Saga, Ichikawa (JP); Kenichi Morikawa, Kawasaki (JP); Kazuhiko Nakazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 344 days.

(21) Appl. No.: 12/576,449

(22) Filed: Oct. 9, 2009

(65) Prior Publication Data

US 2010/0119060 A1    May 13, 2010

(30) Foreign Application Priority Data

Nov. 13, 2008   (JP) .................................. 2008-291496

(51) Int. Cl.
*H04L 9/18* (2006.01)

(52) U.S. Cl. ............. 380/43; 380/277; 380/44; 713/171

(58) Field of Classification Search .................. None
See application file for complete search history.

(56) References Cited

U.S. PATENT DOCUMENTS

| | | | | |
|---|---|---|---|---|
| 7,035,827 B2* | 4/2006 | Ezaki | ............................... | 705/51 |
| 2006/0095935 A1* | 5/2006 | Ooi et al. | ......................... | 725/25 |
| 2009/0187762 A1* | 7/2009 | Okamoto et al. | ............. | 713/157 |
| 2010/0088515 A1* | 4/2010 | Nishimoto et al. | ........... | 713/168 |

FOREIGN PATENT DOCUMENTS

| | | |
|---|---|---|
| JP | 10-191302 | 7/1998 |
| JP | 2006-129244 | 5/2006 |

\* cited by examiner

*Primary Examiner* — Fikremariam A Yalew
(74) *Attorney, Agent, or Firm* — Cowan, Liebowitz & Latman, P.C.

(57) ABSTRACT

The present invention provides a receiving apparatus including a device key generating unit which generates a device key, a work key generating unit which generates a work key, a device key storing unit which sequentially stores the generated device key, every time the device key is updated, and a recording unit which stores a digital broadcast signal in a transport stream format, wherein in a case where the device key generating unit cannot generate, from the stored transport stream, a device key necessary for descrambling the stored transport stream when the stored transport stream is to be reproduced, the work key generating unit decrypts an encrypted work key that is obtained from the stored transport stream, using the device key stored in the device key storing unit, and generates a work key.

12 Claims, 10 Drawing Sheets

F I G. 3
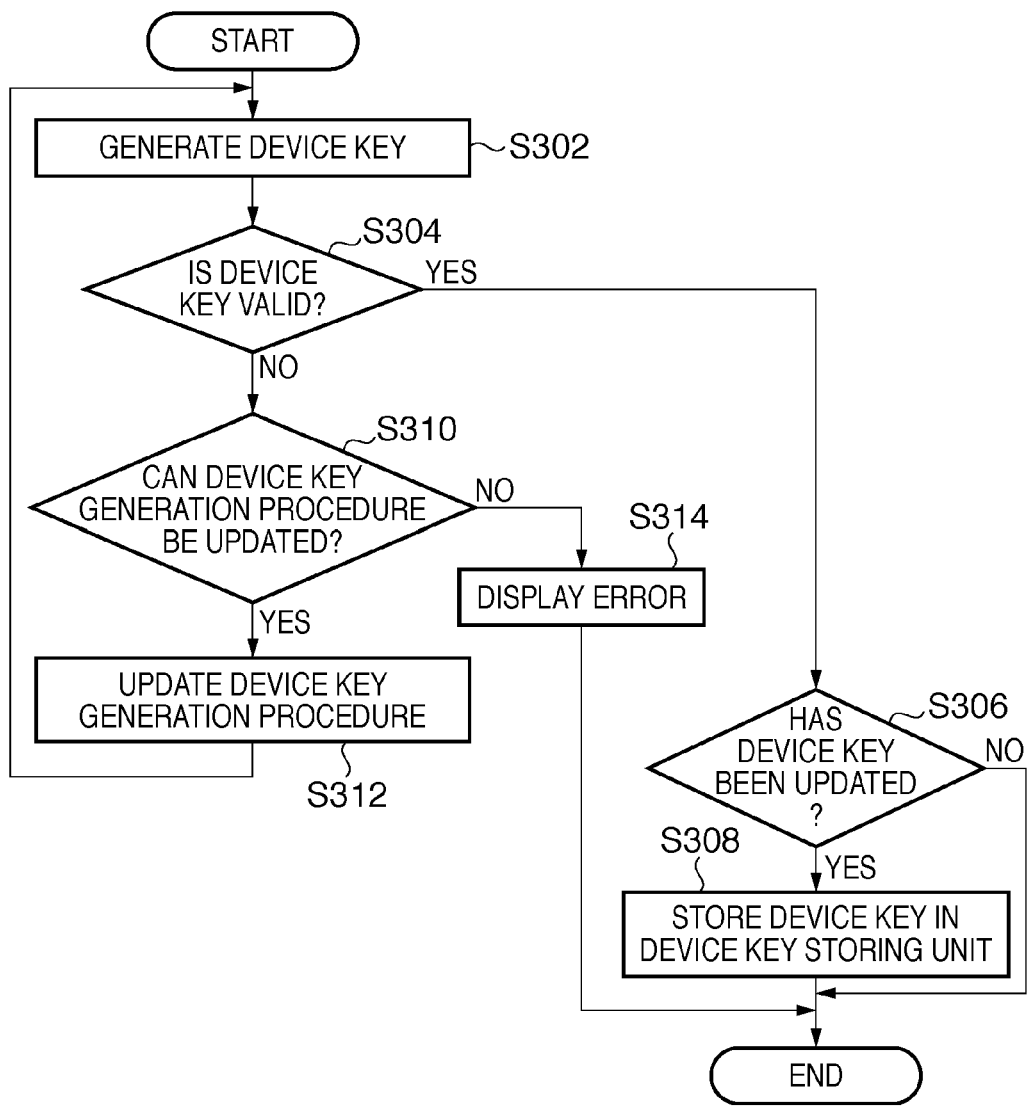

RECEIVING APPARATUS AND METHOD FOR CONTROLLING THE SAME

BACKGROUND OF THE INVENTION

1. Field of the Invention

The present invention relates to a receiving apparatus and a method for controlling the same.

2. Description of the Related Art

Digital content can be easily copied (duplicated) without degrading image quality, which may cause a serious problem, such as the infringement of copyrights and illegal circulation of content. In view of this, a receiving system having enhanced protective measures for copyrights has been adopted in digital broadcasting that is in current operation. For example, content transmitted via a digital broadcast signal (broadcast wave) is scrambled (encrypted), and only a receiving apparatus that is authorized based on a viewing contract can descramble (decrypt) the content. In order to realize such a receiving system, a conditional access system has been generally adopted.

In the conditional access system, it is important to specify an authorized receiving apparatus, scramble content so that the content is securely transmitted, and allow only an authorized receiving apparatus to properly descramble the scrambled content. Here, an authorized receiving apparatus is a receiving apparatus that is considered to have functions (capabilities) that do not violate copyright protection, and has an authorized viewing contract.

At present, in order to specify an authorized receiving apparatus and to realize secured transmission and reception of content, a conditional access system (CAS) in which an IC card is used has been adopted. Since an IC card includes an ID number unique to the card, and information on a master key necessary for descrambling content, an authorized receiving apparatus can be specified using the information included in this IC card. Note that content is encrypted with three keys including information on a master key, and can be viewed only with an authorized receiving apparatus.

Preparation for practical use of a conditional access system in which an IC card is not used is also progressing, and a new content protection system (hereafter referred to as a "new RMP system") has been recently standardized (see the Association of Radio Industries and Businesses standard "Conditional Access System Specifications for Digital Broadcasting" (ARIB STD B-25 Ver5.1) Part 3 "Reception Control System").

In the new RMP system, since an IC card is not used, key information is encrypted, included in an EMM (Entitlement Management Message), and transmitted via a broadcast signal. An EMM is data used for transmitting information on a device ID, and mainly for transmitting a device key that has a device ID added thereto for identifying an EMM and that is allocated to receiving apparatuses on a model-by-model basis. A receiving apparatus extracts key information (information on a device key) corresponding to a device ID from an EMM. A device key (information on a device key) included in the EMM is encrypted, and the receiving apparatus generates a device key by applying a specific device key generation procedure. Note that a device key generation procedure refers to, for example, software for executing a certain algorithm so as to generate a device key, or hardware for performing a certain process so as to generate a device key.

Content is encrypted with three keys, and in order to descramble such content, a work key and a scrambling key are necessary in addition to a device key. A work key is encrypted using a device key, included in an EMM, and transmitted via a broadcast signal. A scrambling key is encrypted using a work key, included in an ECM (Entitlement Control Message), and transmitted via a broadcast signal. Note that an ECM is data used for transmitting information common to all the receiving apparatuses, and mainly for transmitting a scrambling key for a scrambled broadcast, and information on a program. Therefore, in the new RMP system, only an authorized receiving apparatus sequentially decrypts an encryption key and content using a device key first, which enables viewing of content.

Furthermore, in the new RMP system, when a device key (information on a device key) is leaked and abused for copyright infringement and the like, the key information included in an EMM is updated (called "revoked"). Accordingly, the leaked device key (the information on the leaked device key) cannot be used, and therefore content can be securely transmitted again after key information is updated.

However, when a device key generation procedure is leaked, even if key information included in an EMM is updated, the updated device key will be generated by applying the device key generation procedure. Therefore, when a device key generation procedure is leaked, the EMM for the model targeted for revocation is updated to an EMM with which a device key cannot be generated using the leaked device key generation procedure. Accordingly, the model targeted for revocation cannot generate a device key, and therefore content cannot be viewed. Note that in order to enable viewing of content, it is sufficient that a device key generation procedure is updated to a further secure procedure that is not readily leaked. For example, as a technique for updating key generation software in a receiving apparatus, Japanese Patent Laid-Open No. 2006-129244 proposes a technique with which key generation software cannot be updated in receiving apparatuses other than an authorized receiving apparatus (that is, unauthorized receiving apparatuses).

On the other hand, receiving apparatuses have also been practically used in which content of a digital broadcast is stored (recorded) in a recording apparatus such as a hard disk, so that such content can be repeatedly viewed (reproduced). With current digital broadcasting, MPEG-2 (Moving Picture Experts Group) systems have been adopted, and the transport stream (TS) is used. Streams, such as video, audio, data for data broadcasting, transmission-control information, and reception-control information, are divided in units of TS packet transmission and included in TS packets, and are transmitted using time division multiplexing. When such TS data is stored in a recording apparatus, if the TS data is stored as is, it is possible to store the data without degrading image quality.

When TS data that has not been descrambled is stored (recorded), such TS data has a function for protecting copyright equivalent to that of a broadcast signal. Note that even in a case such as a case where TS data cannot be descrambled since key information is not provided or the like, it is possible to store TS data that is not descrambled.

In order to reproduce TS data that is stored (recorded) in a recording apparatus and is not descrambled (recorded TS data), similar to the case of viewing a broadcast signal, it is necessary to descramble the recorded TS data. At this time, an EMM and an ECM that are included in the recorded TS data are extracted, and a device key, a work key, and a scrambling key are decrypted.

However, in the new RMP, when a device key generation procedure is updated, TS data recorded before the device key generation procedure was updated cannot be descrambled, and therefore it is impossible to view content even with an authorized receiving apparatus. This is because a device key generation procedure from after the update is applied to an EMM included in the recorded TS data, and therefore a device key cannot be generated, or a device key is invalid even if a device key can be generated.

SUMMARY OF THE INVENTION

The present invention provides a technique with which a transport stream stored in a scrambled manner (recorded TS data) can be descrambled, irrespective of whether a device key generation procedure has been updated.

According to one aspect of the present invention, there is provided a receiving apparatus, including a receiving unit configured to receive a digital broadcast signal including a scrambled broadcast signal, information for generating a device key, an encrypted work key, and an encrypted scrambling key, in a transport stream format, a device key generating unit configured to generate a device key by obtaining the information for generating the device key from the transport stream and applying a device key generation procedure that has been stored in advance in the receiving apparatus, a work key generating unit configured to obtain the encrypted work key from the transport stream, decrypt the encrypted work key using the device key generated by the device key generating unit, and generate a work key, a scrambling key generating unit configured to obtain the encrypted scrambling key from the transport stream, decrypt the encrypted scrambling key using the work key generated by the work key generating unit, and generate a scrambling key, a descrambling unit configured to descramble the scrambled broadcast signal using the scrambling key generated by the scrambling key generating unit, a device key storing unit configured to sequentially store the device key generated by the device key generating unit, every time the device key is updated, and a recording unit configured to store the digital broadcast signal in the transport stream format, wherein in a case where the device key generating unit cannot generate, from the stored transport stream, a device key necessary for descrambling the stored transport stream when the transport stream stored by the recording unit is to be reproduced, the work key generating unit decrypts the encrypted work key that is obtained from the stored transport stream, using the device key stored in the device key storing unit, and generates a work key.

Further aspects of the present invention will become apparent from the following description of exemplary embodiments with reference to the attached drawings.

BRIEF DESCRIPTION OF THE DRAWINGS

FIG. 3 is a flow chart for describing an operation for generating a device key and an operation for updating a device key generation procedure in the first embodiment.

DESCRIPTION OF THE EMBODIMENTS

Figure 1:
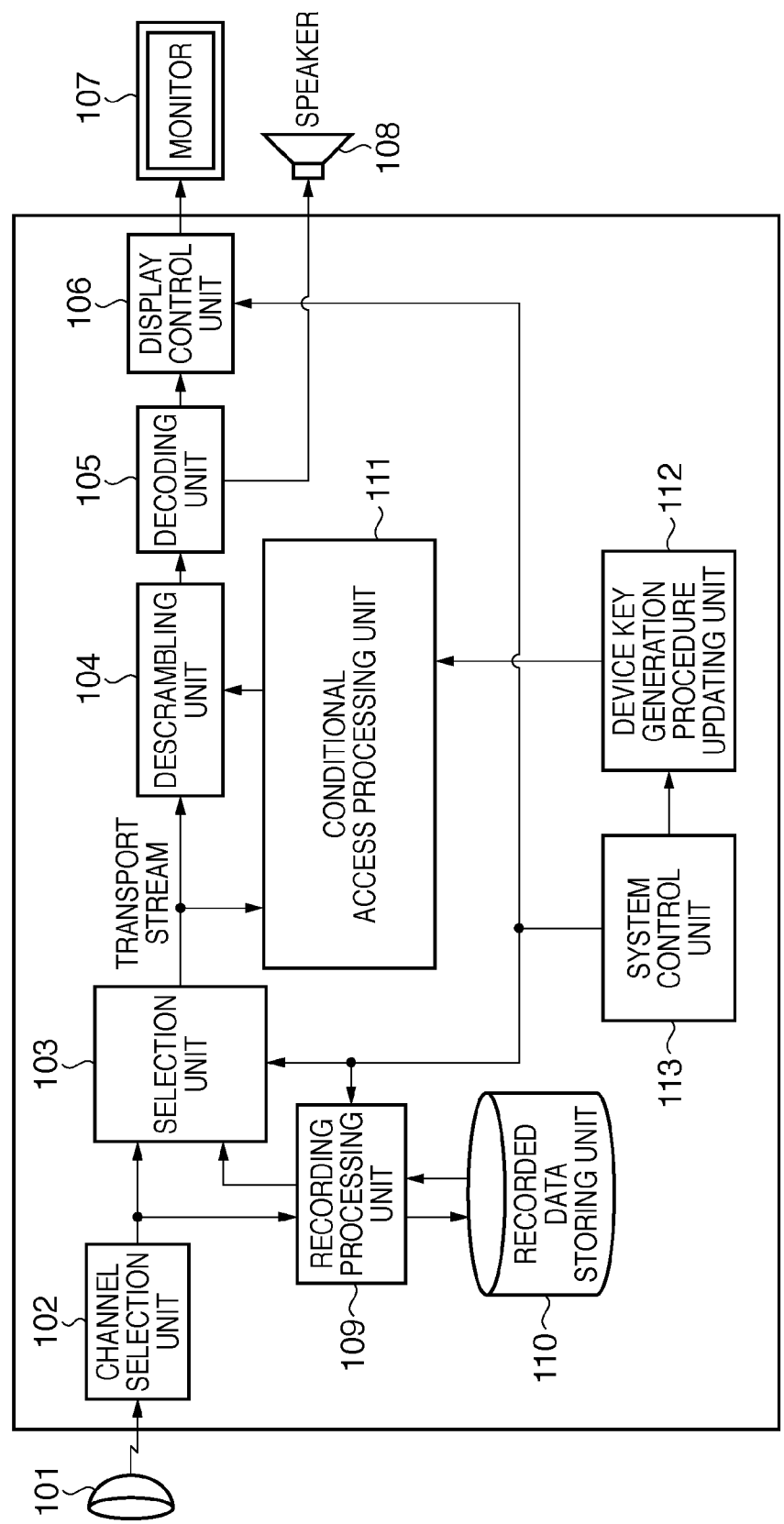
FIG. 1 is a schematic block diagram showing the configuration of a receiving apparatus as one aspect of the present invention.

Preferred embodiments of the present invention will be described below with reference to the accompanying drawings. Note that the same reference numerals denote the same members throughout the drawings, and a repetitive description thereof will not be given.

<First Embodiment>

FIG. 1 is a schematic block diagram showing the configuration of a receiving apparatus 1 as one aspect of the present invention. The receiving apparatus 1 receives a digital broadcast signal including a scrambled broadcast signal, information for generating a device key, an encrypted work key, and an encrypted scrambling key for descrambling the broadcast signal, in the transport stream (TS) format. The receiving apparatus 1 generates video, audio, data, program-related information, and the like, from the digital broadcast signal, and outputs them. Consequently, a viewer can view digitally broadcasted content. Note that a description is given assuming that the receiving apparatus 1 adopts a new RMP as a content protection system. However, a system in which CAS software is downloaded such as a DCAS (Downloadable Conditional Access System), for example, may also be applied.

The receiving apparatus 1 includes an antenna 101, a channel selection unit 102, a selection unit 103, a descrambling unit 104, a decoding unit 105, a display control unit 106, a monitor 107, and a speaker 108. Furthermore, the receiving apparatus 1 includes a recording processing unit 109, a recorded data storing unit 110, a conditional access processing unit 111, a device key generation procedure updating unit 112, and a system control unit 113.

The antenna 101 receives a digital broadcast signal, and outputs the received signal to the channel selection unit 102.

The channel selection unit 102 selects desired content from the digital broadcast signal received by the antenna 101 (hereafter referred to as "received data").

The selection unit 103 selects whether to view receive data input via the antenna 101 and the channel selection unit 102 or to view (reproduce) a transport stream stored in the recorded data storing unit 110 described later (recorded TS data). Note that in the present embodiment, received data and recorded TS data are scrambled TS data, and are inputted to the descrambling unit 104 and the conditional access processing unit 111 via the selection unit 103.

The descrambling unit 104 descrambles received data or recorded TS data that have been scrambled, using a scrambling key supplied from the conditional access processing unit 111 (that is, a process for descrambling is performed).

The decoding unit 105 has a function for decoding compressed data, decodes received data or TS data inputted from the descrambling unit 104 into video and audio that can be viewed, and outputs the decoded video and audio to the display control unit 106 and the speaker 108, respectively.

The display control unit 106 composites video from the decoding unit 105 with a program information display, an error information display, and the like, and outputs the composited video to the monitor 107.

The monitor 107 outputs (displays) video from the display control unit 106.

The speaker 108 outputs audio from the decoding unit 105.

When content selected by the channel selection unit 102 is stored (recorded), the recording processing unit 109 performs a process for copyright protection control or the like on TS data including an EMM and an ECM.

The recorded data storing unit 110 is constituted, for example, by a hard disk drive, and stores TS data on which the recording processing unit 109 performed a process. In other words, the recorded data storing unit 110 stores a digital broadcast signal in the TS format.

Note that although the receiving apparatus 1 has a recording function (that is, the recording processing unit 109 and the recorded data storing unit 110) in the present embodiment, a recording function may be realized by an external apparatus that can be connected to the receiving apparatus 1.

The conditional access processing unit 111 realizes conditional access in the new RMP system. The conditional access processing unit 111 generates a scrambling key for descrambling by at least using a device key, and supplies this scrambling key to the descrambling unit 104. In the new RMP system, a device key is allocated to receiving apparatuses on a model-by-model basis, and an EMM including information for generating a device key (for example, an encrypted device key) is multiplexed on a digital broadcast signal. The conditional access processing unit 111 will be described in detail later.

The device key generation procedure updating unit 112 updates a device key generation procedure to be applied to information for generating a device key. However, the device key generation procedure updating unit 112 determines whether or not a device key generation procedure can be updated before updating the device key generation procedure, and updates the device key generation procedure only if the device key generation procedure updating unit 112 has determined that it is possible to update the device key generation procedure. Here, a device key generation procedure refers to a device key generation algorithm if the procedure is realized through a software process, for example. Therefore, the device key generation procedure updating unit 112 updates a device key generation procedure by changing a device key generation algorithm. However, a device key generation procedure can also be realized as a hardware process. In such a case, the device key generation procedure updating unit 112 updates a device key generation procedure by exchanging hardware.

When a device key or a device key generation procedure is leaked, an unauthorized receiving apparatus that infringes on copyrights may appear, and thus a device key is updated (revoked). Specifically, in order to invalidate the leaked device key, a broadcaster updates information on an EMM and ECM including viewing control information. When information on an EMM and ECM is updated, a leaked device key or a device key generated by applying a leaked device key generation procedure will become invalid.

However, in the new RMP system, since a device key is common for each model of receiving apparatus, a device key is invalidated for receiving apparatuses of the same model as the model that suffered a leak, and therefore it is impossible to view content even with an authorized receiving apparatus. In view of this, in the present embodiment, the device key generation procedure updating unit 112 updates a device key generation procedure to a device key generation procedure that corresponds to an EMM that has been updated, which enables viewing of content with a receiving apparatus if the apparatus is authorized. On the other hand, since an unauthorized receiving apparatus cannot update a device key generation procedure, it is impossible to view content with such an apparatus. Note that the device key generation procedure updating unit 112 is required to update a device key generation procedure to the procedure with improved security against the leak.

On the other hand, recorded TS data stored in the recorded data storing unit 110 before the device key generation procedure was updated includes an EMM from before the device key generation procedure was updated, and this EMM does not correspond to the device key generation procedure from after the update, and accordingly such data cannot be viewed. All the receiving apparatuses are influenced by this, regardless of whether they are authorized or unauthorized. In view of this, in the present embodiment, even when a device key generation procedure is updated, recorded TS data stored in the recorded data storing unit 110 before the device key generation procedure was updated can be properly viewed, as described later.

The system control unit 113 controls overall operation of the receiving apparatus 1. Therefore, units that constitute the receiving apparatus 1 are controlled by the system control unit 113 so as to operate in cooperation with each other.

Figure 2:
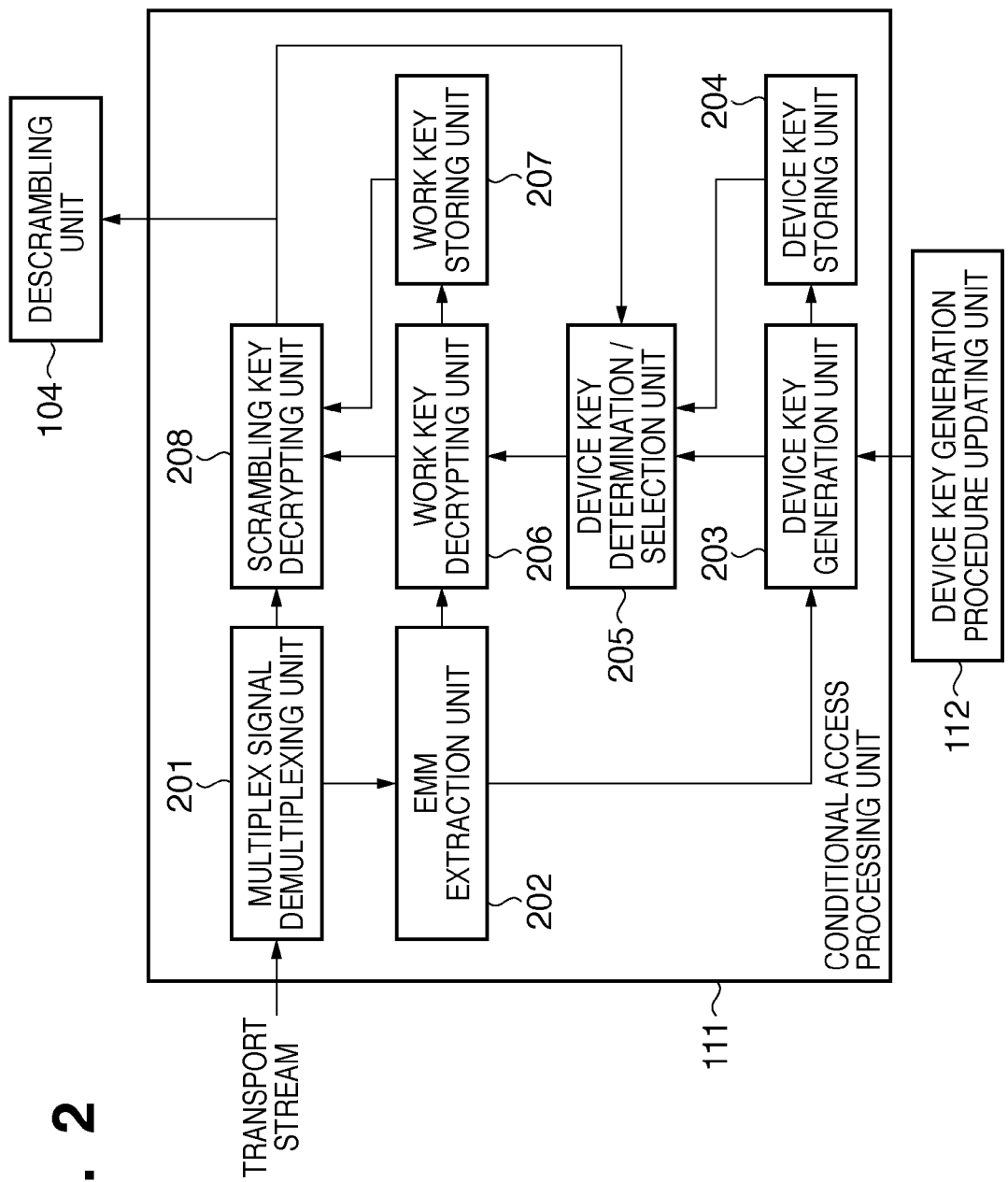
FIG. 2 is a schematic block diagram showing the configuration of a conditional access processing unit in a first embodiment.

Here, the conditional access processing unit 111 is described in detail. FIG. 2 is a schematic block diagram showing the configuration of the conditional access processing unit 111 in the present embodiment. The conditional access processing unit 111 includes a multiplex signal demultiplexing unit 201, an EMM extraction unit 202, a device key generation unit 203, a device key storing unit 204, and a device key determination/selection unit 205. Furthermore, the conditional access processing unit 111 includes a work key decrypting unit 206, a work key storing unit 207, and a scrambling key decrypting unit 208.

The multiplex signal demultiplexing unit 201 demultiplexes an EMM from received data, and outputs the EMM to the EMM extraction unit 202. Also, the multiplex signal demultiplexing unit 201 demultiplexes an ECM from received data, and outputs the ECM to the scrambling key decrypting unit 208.

The EMM extraction unit 202 extracts (obtains) an EMM necessary for the receiving apparatus (that is, an EMM including information for generating a device key corresponding to the model thereof or an EMM including an encrypted work key corresponding to the model thereof). Since EMMs input from the multiplex signal demultiplexing unit 201 include EMMs for all the models, the EMM extraction unit 202 needs to extract only an EMM corresponding to the model thereof.

Also, the EMM extraction unit 202 outputs, among extracted EMMs, an EMM including information for generating a device key to the device key generation unit 203, and an EMM including an encrypted work key to the work key decrypting unit 206.

The device key generation unit 203 generates a device key by applying a device key generation procedure that has been stored in advance in the receiving apparatus to information for generating a device key included in an EMM from the EMM extraction unit 202. Note that a device key generation procedure in the device key generation unit 203 is constituted such that the procedure can be updated by the device key generation procedure updating unit 112.

The device key storing unit 204 is constituted, for example, by a nonvolatile flash memory or the like, and sequentially stores a device key generated by the device key generation unit 203, every time the device key is updated.

The device key determination/selection unit 205 determines whether or not a device key has been properly generated by the device key generation unit 203. Furthermore, the device key determination/selection unit 205 determines whether or not a device key generated by the device key generation unit 203 is valid. Specifically, the device key determination/selection unit 205 determines that such a device key is valid, if an encrypted scrambling key can be decrypted (the encryption of the scrambling key is decrypted) by at least using the device key generated by the device key generation unit 203. Also, the device key determination/selection unit 205 can select a device key stored in the device key storing unit 204, and can determine whether this device key is valid.

Further, if the device key determination/selection unit 205 determines that the device key generated by the device key generation unit 203 is valid, the device key determination/selection unit 205 determines whether or not this device key has been updated.

Using a device key supplied from the device key generation unit 203 or the device key storing unit 204 via the device key determination/selection unit 205, the work key decrypting unit 206 decrypts an encrypted work key included in an EMM from the EMM extraction unit 202 so as to generate a work key.

The work key storing unit 207 is constituted, for example, by a nonvolatile flash memory or the like, and stores a work key generated by the work key decrypting unit 206.

Using a work key supplied from the work key decrypting unit 206 or the work key storing unit 207, the scrambling key decrypting unit 208 decrypts an encrypted scrambling key included in an ECM from the multiplex signal demultiplexing unit 201 so as to generate a scrambling key. Further, the scrambling key decrypting unit 208 supplies the generated scrambling key to the descrambling unit 104, and also outputs information indicating whether or not it was possible to decrypt the encrypted scrambling key to the device key determination/selection unit 205.

Hereafter, operations performed by the receiving apparatus 1 in the present embodiment are described.

First, with reference to FIG. 3, an operation for generating a device key, and an operation for updating a device key generation procedure are described.

In step S302, the device key generation unit 203 generates a device key by applying a device key generation procedure to information for generating a device key included in an EMM from the EMM extraction unit 202.

In step S304, the device key determination/selection unit 205 determines whether or not the device key generated in step S302 is valid.

If it is determined that the device key is valid in step S304, the processing proceeds to step S306.

In step S306, the device key determination/selection unit 205 determines whether or not the device key determined as being valid in step S304 has been updated (that is, whether or not the device key is a new device key). Specifically, the device key determination/selection unit 205 determines whether or not the device key has been updated by referring to device key update information included in an EMM. However, the device key determination/selection unit 205 may determine whether or not the device key has been updated by comparing it with the device key used for descrambling in the past.

In step S306, if it is determined that the device key has been updated, the processing proceeds to step S308. On the other hand, if it is determined that the device key is not updated in step S306, since this device key has already been stored in the device key storing unit 204, the operation ends.

In step S308, the device key storing unit 204 stores the device key determined as having been updated in step S306, and the operation ends.

On the other hand, if it is determined that a device key is not valid (that is, the device key is invalid) in step S304, the device key generation procedure may have been updated, and thus the processing proceeds to step S310.

In step S310, the device key generation procedure updating unit 112 determines whether or not a device key generation procedure can be updated. If it is determined that a device key generation procedure can be updated, the processing proceeds to step S312. On the other hand, if it is determined that a device key generation procedure cannot be updated, the processing proceeds to step S314.

In step S312, the device key generation procedure updating unit 112 updates a device key generation procedure, and the processing returns to step S302.

In step S314, a message indicating that a device key generation procedure cannot be updated, that is, a device key necessary for descrambling cannot be generated (an error) is displayed on the monitor 107, and the operation ends.

According to the operation for generating a device key and the device key generation procedure shown in FIG. 3, a device key necessary for descrambling recorded TS data (that is, a device key generated using the device key generation procedure from before the update) is in a state of being stored in the device key storing unit 204. A device key generation procedure is also updated, which creates a state where a device key necessary for descrambling received data can be generated.

Next, an operation for reproducing recorded TS data is described with reference to FIG. 4.

First, in step S402, the system control unit 113 determines whether or not there is a request for reproducing recorded TS data. If the selection unit 103 has selected reproducing recorded TS data in response to a user instruction (operation), the system control unit 113 determines that there is a request for reproducing recorded TS data, and the processing proceeds to step S404. On the other hand, if the selection unit 103 has selected viewing received data in response to a user instruction, the system control unit 113 determines that there is no request for reproducing recorded TS data, and the operation ends.

In step S404, the EMM extraction unit 202 extracts an EMM from the recorded TS data.

In step S406, the device key generation unit 203 generates a device key by applying a device key generation procedure to information for generating a device key included in the EMM extracted in step S404.

In step S408, the device key determination/selection unit 205 determines whether or not the device key was properly generated in step S406. If a device key generation procedure is updated after recorded TS data has been stored in the recorded data storing unit 110, a device key may not be properly generated in step S406.

In step S408, if it is determined that the device key could not be properly generated, the processing proceeds to step S410. If the device key could not be properly generated in step S406, recorded TS data cannot be descrambled. In view of this, device keys stored in the device key storing unit 204 that were generated before the device key generation procedure was updated are sequentially selected, and recorded TS data is descrambled.

In step S410, the device key determination/selection unit 205 determines whether or not a device key is stored in the device key storing unit 204. If it is determined that a device key is not stored in the device key storing unit 204, a message indicating that a device key necessary for descrambling recorded TS data cannot be generated (an error) is displayed on the monitor 107 in step S418, and the operation ends. If it is determined that a device key is stored in the device key storing unit 204, the processing proceeds to step S412.

In step S412, the device key determination/selection unit 205 selects one device key from the device keys stored in the device key storing unit 204.

In step S414, the device key determination/selection unit 205 determines whether or not the device key selected in step S412 is valid. If it is determined that the device key is not valid, the processing returns to step S410 in order to search for a valid device key from the device keys stored in the device key storing unit 204. If it is determined that the device key is valid, the processing proceeds to step S416.

In step S416, the descrambling unit 104 descrambles recorded TS data using a scrambling key decrypted by at least using the device key determined as being valid in step S414.

Thus, in the present embodiment, in the case where recorded TS data cannot be descrambled using a device key generated from the recorded TS data when the data is to be reproduced, the data is descrambled using a device key stored in the device key storing unit 204. Therefore, with the receiving apparatus 1 in the present embodiment, even after a device key generation procedure is updated, without compromising the security of copyright protection, it is possible to view recorded TS data stored before the device key generation procedure was updated.

Note that in the present embodiment, the device key determination/selection unit 205 sequentially selects device keys stored in the device key storing unit 204 and determines whether or not recorded TS data can be descrambled (whether or not the device key is valid). However, when a device key is stored, if a table showing the correspondence between that device key and recorded TS data is stored in the device key storing unit 204, it is possible to skip a step for determining whether or not the device key is valid. In this case, the descrambling unit 104 descrambles data using a device key shown in that table, according to recorded TS data to be reproduced.

<Second Embodiment>

Figure 5:
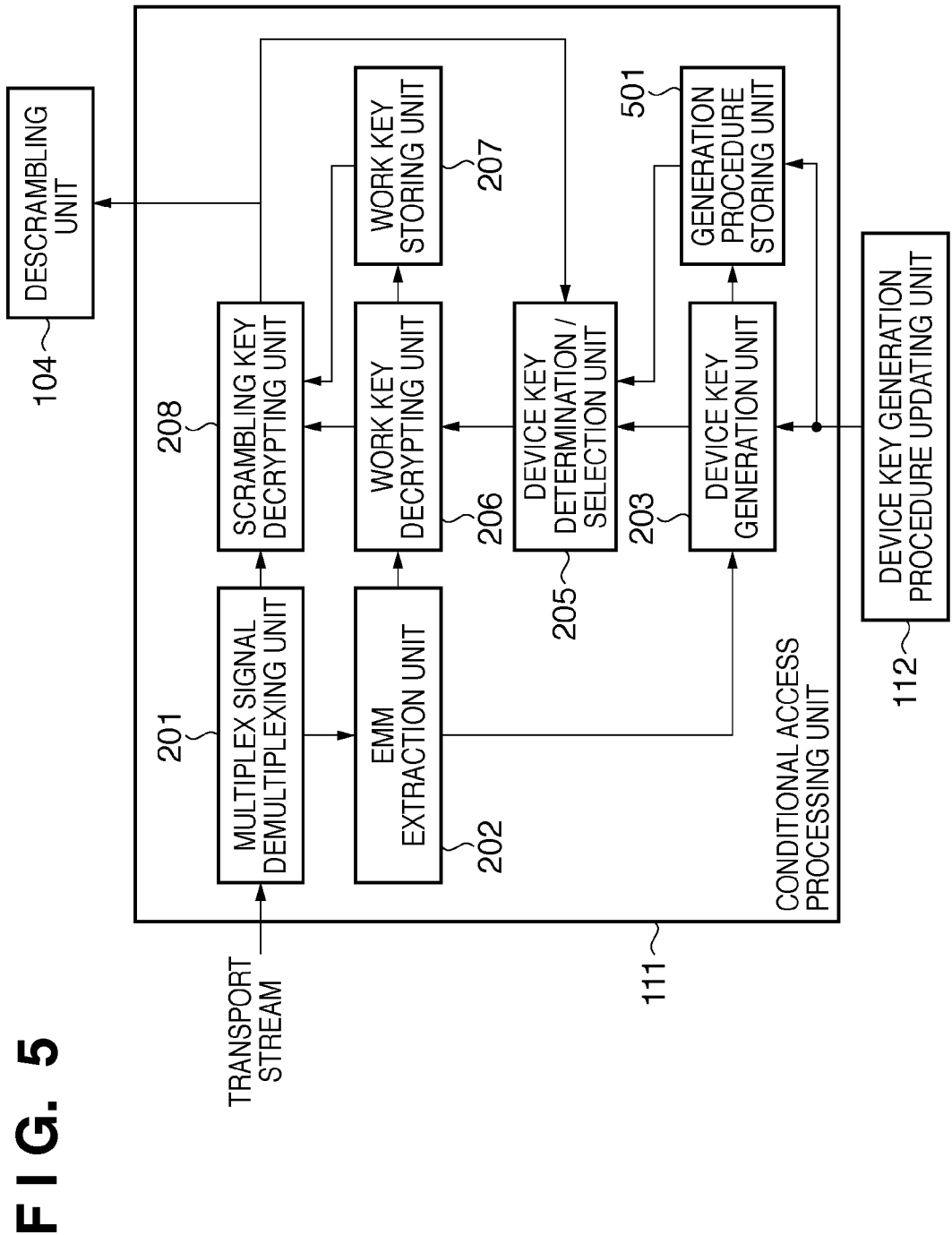
FIG. 5 is a schematic block diagram showing the configuration of a conditional access processing unit in a second embodiment.

FIG. 5 is a schematic block diagram showing the configuration of the conditional access processing unit 111 in the present embodiment. As shown in FIG. 5, in the present embodiment, the conditional access processing unit 111 includes a generation procedure storing unit 501 instead of the device key storing unit 204. Note that the configuration of the receiving apparatus 1 is the same as in the first embodiment, with the exception of the configuration of the conditional access processing unit 111.

When a device key generation procedure is updated, the generation procedure storing unit 501 stores a device key generation procedure from before the update. Therefore, all the device key generation procedures used in the past are stored in the generation procedure storing unit 501. The generation procedure storing unit 501 is constituted, for example, by a nonvolatile flash memory that stores a device key generation algorithm when a device key generation procedure is realized through a software process.

Hereafter, operations performed by the receiving apparatus 1 in the present embodiment are described.

Figure 6:
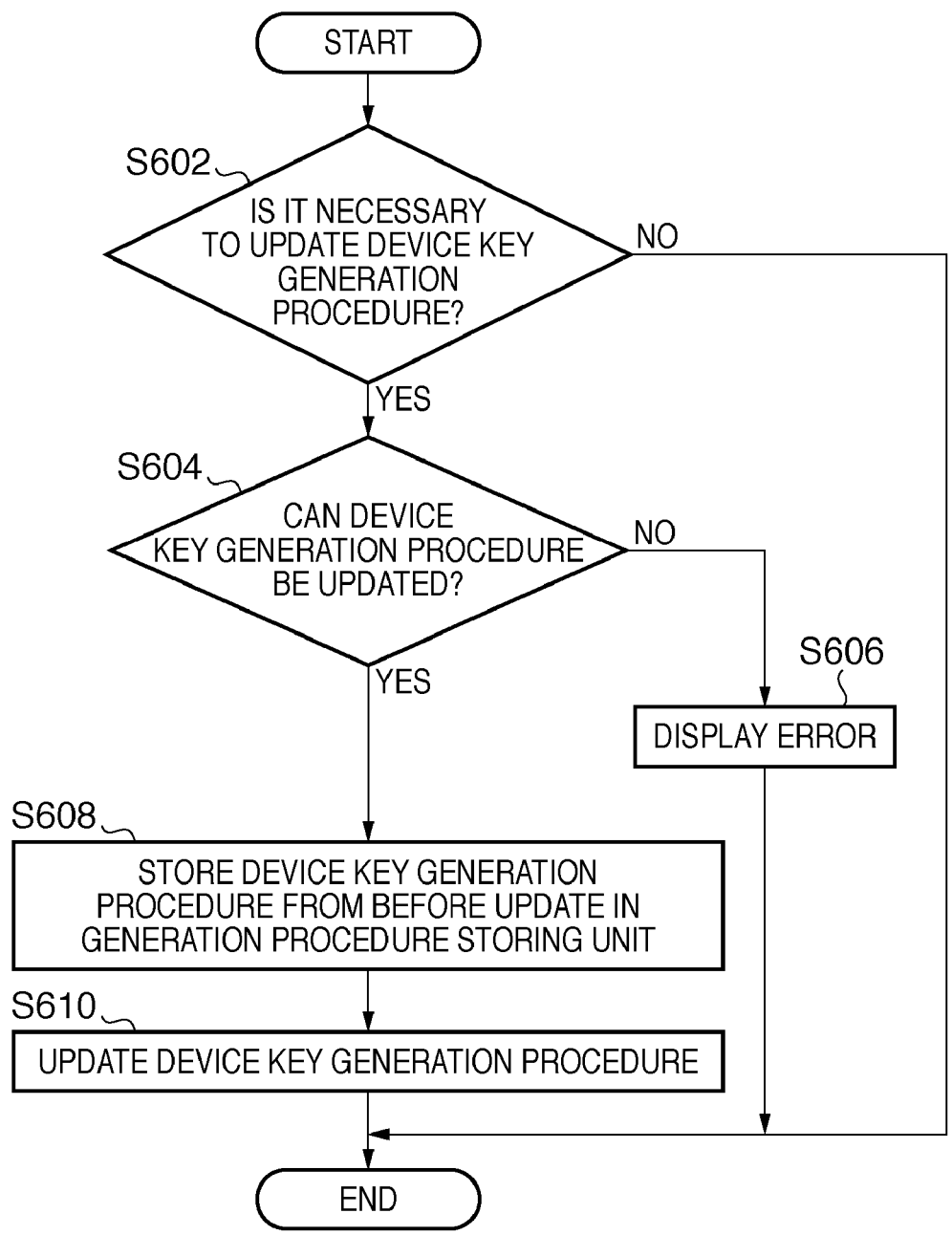
FIG. 6 is a flow chart for describing an operation for updating a device key generation procedure in the second embodiment.

First, an operation for updating a device key generation procedure is described with reference to FIG. 6.

In step S602, the device key generation procedure updating unit 112 determines whether or not a device key update procedure needs to be updated. For example, if the device key generation procedure updating unit 112 receives a notification of revocation from a broadcaster, a device key generation procedure needs to be updated, and the processing proceeds to step S604. Note that the operation ends if a device key generation procedure does not need to be updated.

In step S604, the device key generation procedure updating unit 112 determines whether or not a device key generation procedure can be updated. If it is determined that a device key generation procedure cannot be updated, a message indicating that a device key generation procedure cannot be updated (an error) is displayed on the monitor 107 in step S606, and the operation ends. On the other hand, if it is determined that a device key generation procedure can be updated, the processing proceeds to step S608.

In step S608, the generation procedure storing unit 501 stores a device key generation procedure from before the update (that is, the current device key generation procedure).

In step S610, the device key generation procedure updating unit 112 updates a device key generation procedure, and the operation ends.

Figure 7:
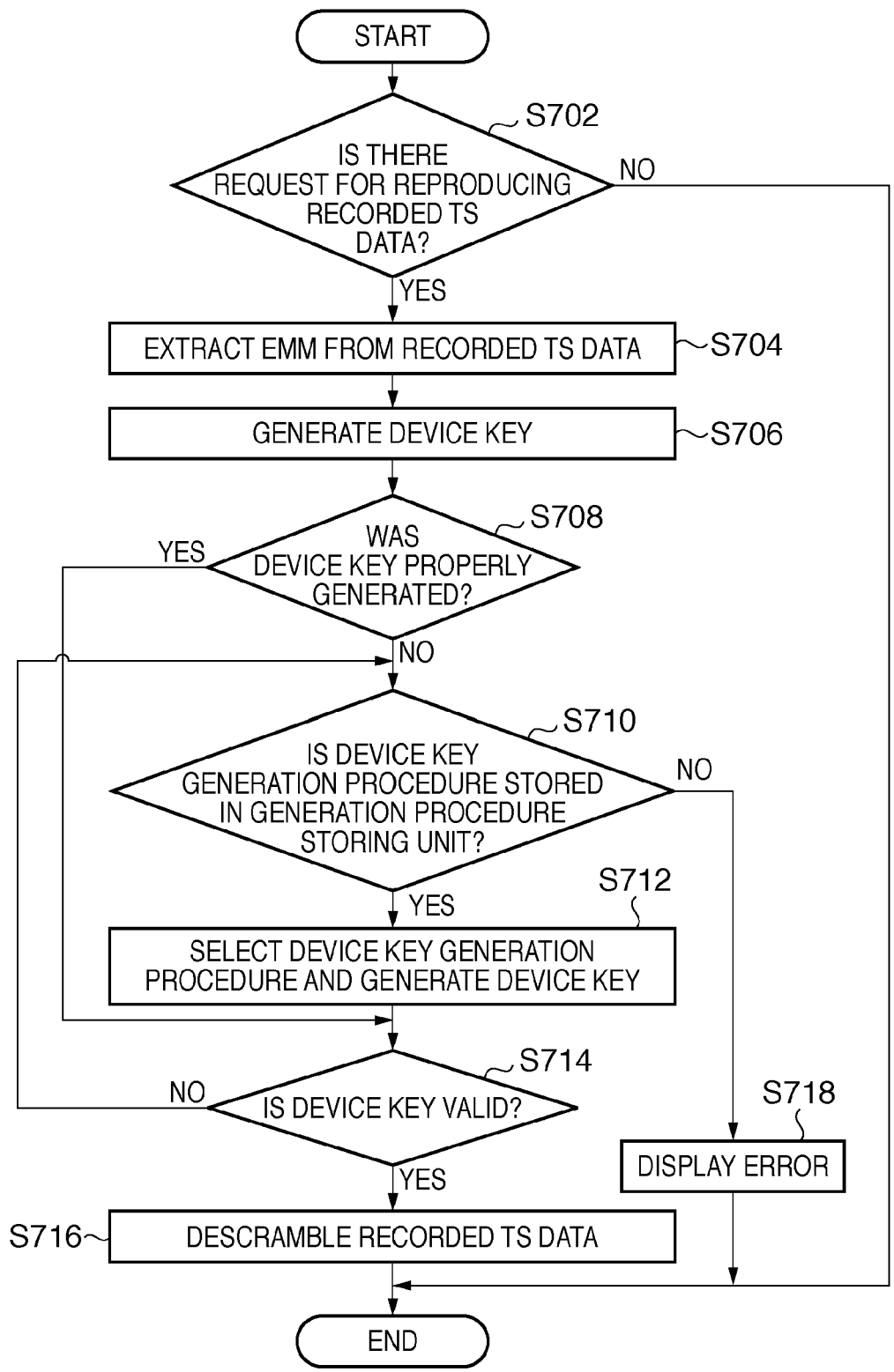
FIG. 7 is a flow chart for describing an operation for reproducing recorded TS data in the second embodiment.

Next, an operation for reproducing recorded TS data is described with reference to FIG. 7.

Figure 4:
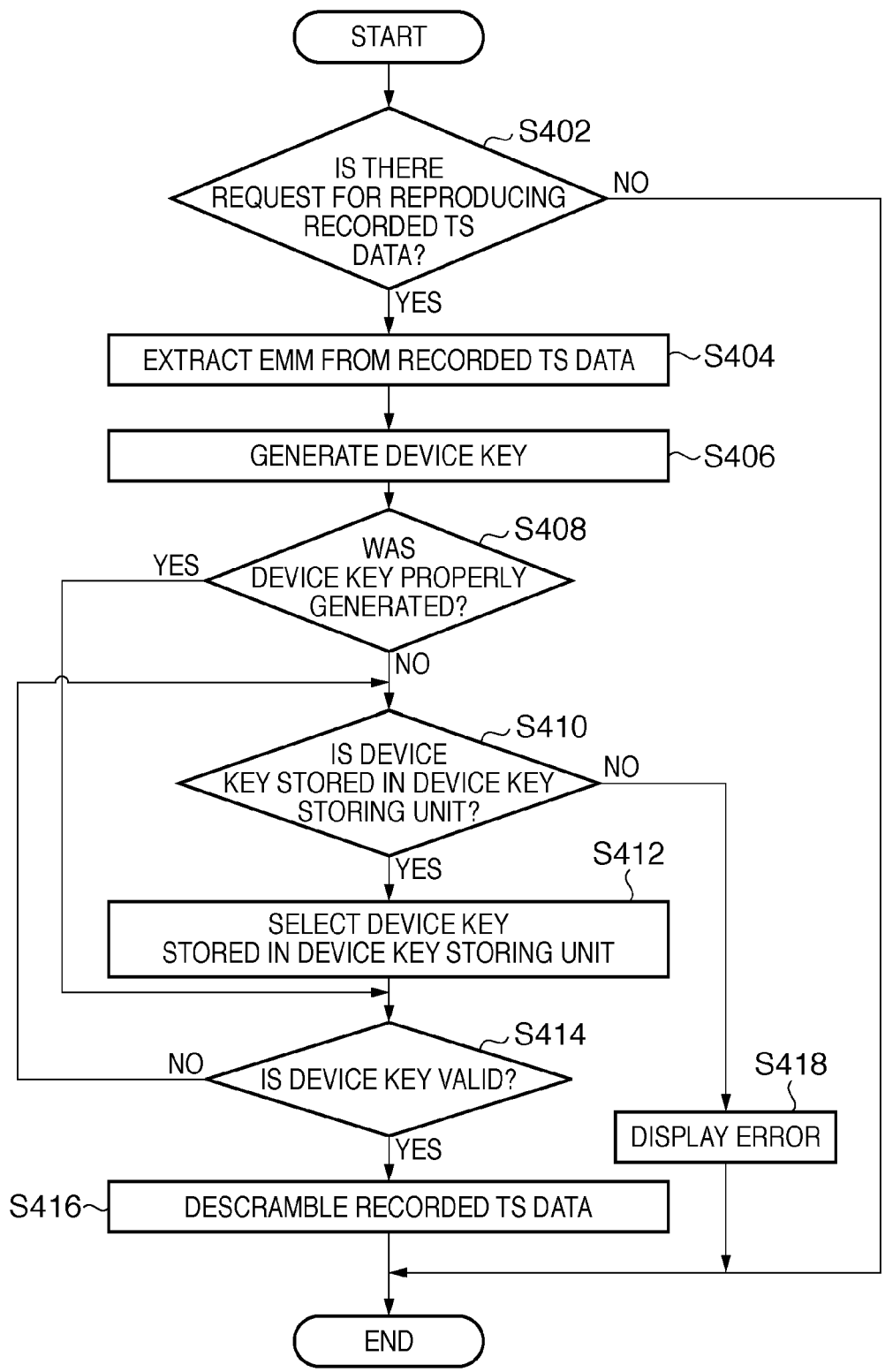
FIG. 4 is a flow chart for describing an operation for reproducing recorded TS data in the first embodiment.

Since steps S702 to 5708 are the same as steps S402 to 5408 in FIG. 4 described in the first embodiment, description thereof is omitted here.

In step S710, the device key generation procedure updating unit 112 determines whether or not a device key generation procedure is stored in the generation procedure storing unit 501. If it is determined that a device key generation procedure is not stored in the generation procedure storing unit 501, a message indicating that a device key necessary for descrambling recorded TS data cannot be generated (an error) is displayed on the monitor 107 in step S718, and the operation ends. If it is determined that a device key generation procedure is stored in the generation procedure storing unit 501, the processing proceeds to step S712.

In step S712, the device key generation unit 203 selects one device key generation procedure from device key generation procedures stored in the generation procedure storing unit 501, and generates a device key by applying that device key generation procedure to recorded TS data.

In step S714, the device key determination/selection unit 205 determines whether or not the device key generated in step S712 is valid. If it is determined that the device key is not valid, the processing returns to step S710 in order to search for a device key generation procedure with which a valid device key can be generated, from the device key generation procedures stored in the generation procedure storing unit 501. If it is determined that the device key is valid, the processing proceeds to step S716.

In step S716, the descrambling unit 104 descrambles recorded TS data using a scrambling key decrypted by at least using the device key determined as being valid in step S714.

Thus, in the present embodiment, in the case where recorded TS data cannot be descrambled using a device key generated from the recorded TS data when the data is to be reproduced, a device key is generated by applying a device key generation procedure from before the update stored in the generation procedure storing unit 501. Then, the recorded TS data is descrambled using the device key generated by applying the device key generation procedure from before the update. Therefore, with the receiving apparatus 1 in the present embodiment, even after the device key generation procedure is updated, without compromising the security of copyright protection, it is possible to view recorded TS data stored before a device key generation procedure was updated.

Note that in the first embodiment, a device key generated by the device key generation unit 203 is directly stored in the device key storing unit 204, and thus a device key may be read without authorization. On the other hand, in the present embodiment, since a device key is not directly stored, and the device key generation procedure is stored, it is possible to improve security (an effect of preventing a device key from being leaked) compared with the first embodiment.

In the present embodiment, device keys are generated by sequentially selecting device key generation procedures stored in the generation procedure storing unit 501, and it is determined whether or not recorded TS data can be descrambled (whether or not the device key is valid). However, when a device key generation procedure is stored, if a table showing the correspondence between that device key generation procedure and recorded TS data is stored in the generation procedure storing unit 501, it is possible to skip a step for determining whether or not the device key is valid. In this case, the device key generation unit 203 generates a device key by applying a device key generation procedure shown in that table, according to recorded TS data to be reproduced.

<Third Embodiment>

Figure 8:
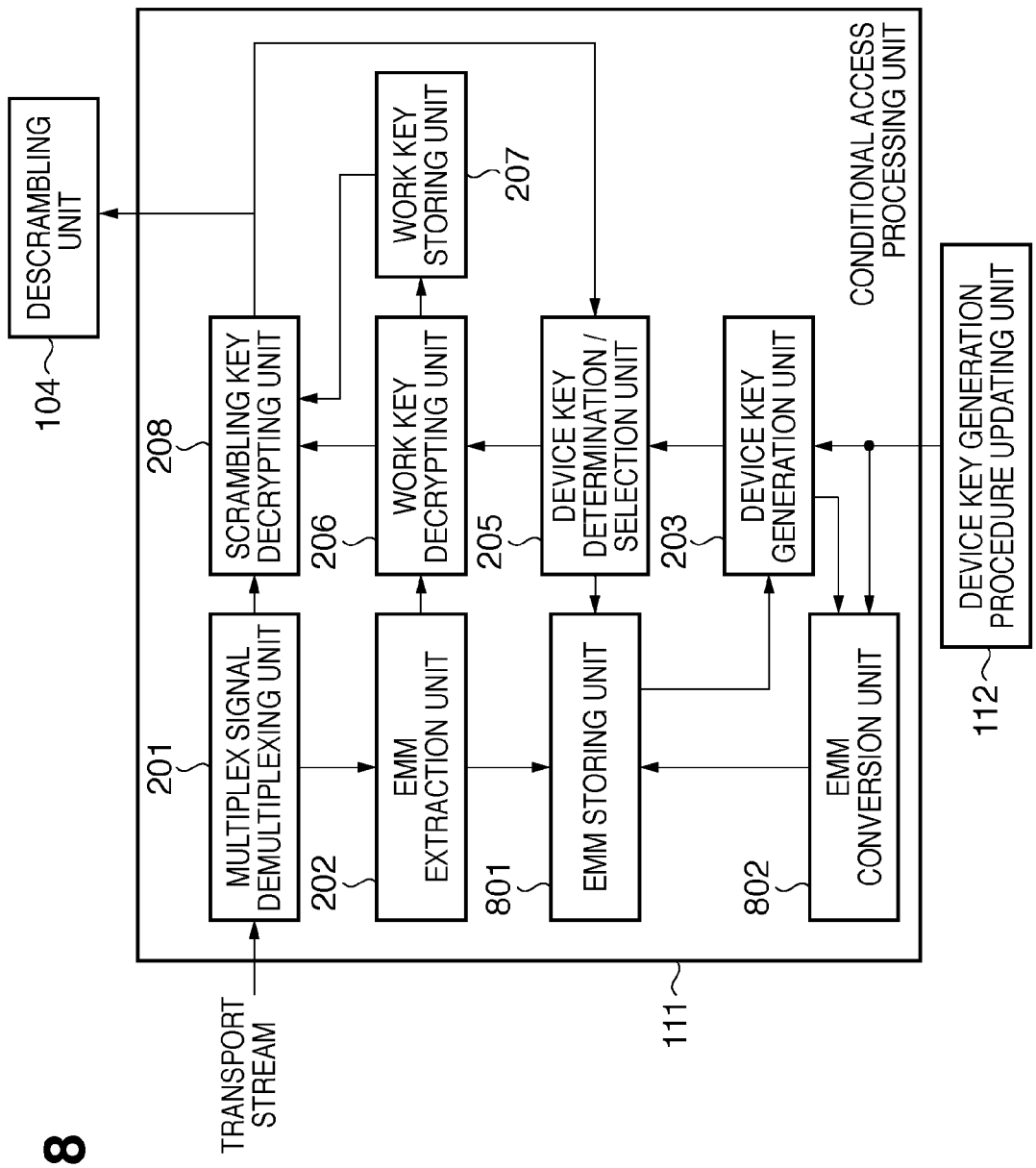
FIG. 8 is a schematic block diagram showing the configuration of a conditional access processing unit in a third embodiment.

FIG. 8 is a schematic block diagram showing the configuration of the conditional access processing unit 111 in the present embodiment. As shown in FIG. 8, in the present embodiment, the conditional access processing unit 111 includes an EMM storing unit 801 and an EMM conversion unit 802 instead of the device key storing unit 204 or the generation procedure storing unit 501. Note that the configuration of the receiving apparatus 1 is the same as in the first embodiment, with the exception of the configuration of the conditional access processing unit 111.

The EMM storing unit 801 has a function for storing an EMM extracted by the EMM extraction unit 202. The EMM storing unit 801 sequentially stores an EMM every time an EMM is updated, as described later. Therefore, all the EMMs used in the past are stored in the EMM storing unit 801. Also, the EMM storing unit 801 outputs an EMM extracted by the EMM extraction unit 202 and a stored EMM to the device key generation unit 203.

The EMM conversion unit 802 has a function for converting a device key into an EMM (that is, an EMM is generated from a device key). If a device key generation procedure is updated, a device key generated from an EMM stored in the EMM storing unit 801 becomes invalid. In view of this, in the present embodiment, before updating a device key generation procedure, a device key is generated by applying a device key generation procedure from before the update to an EMM stored in the EMM storing unit 801 so that an EMM corresponding to the device key generation procedure from after the update is generated from that device key. If a device key generation procedure is updated, the EMM conversion unit 802 converts an EMM stored in the EMM storing unit 801, such that the same device key as a device key generated by applying the device key generation procedure from before the update is generated when the device key generation procedure from after the update is applied.

Hereafter, operations performed by the receiving apparatus 1 in the present embodiment are described.

Figure 9:
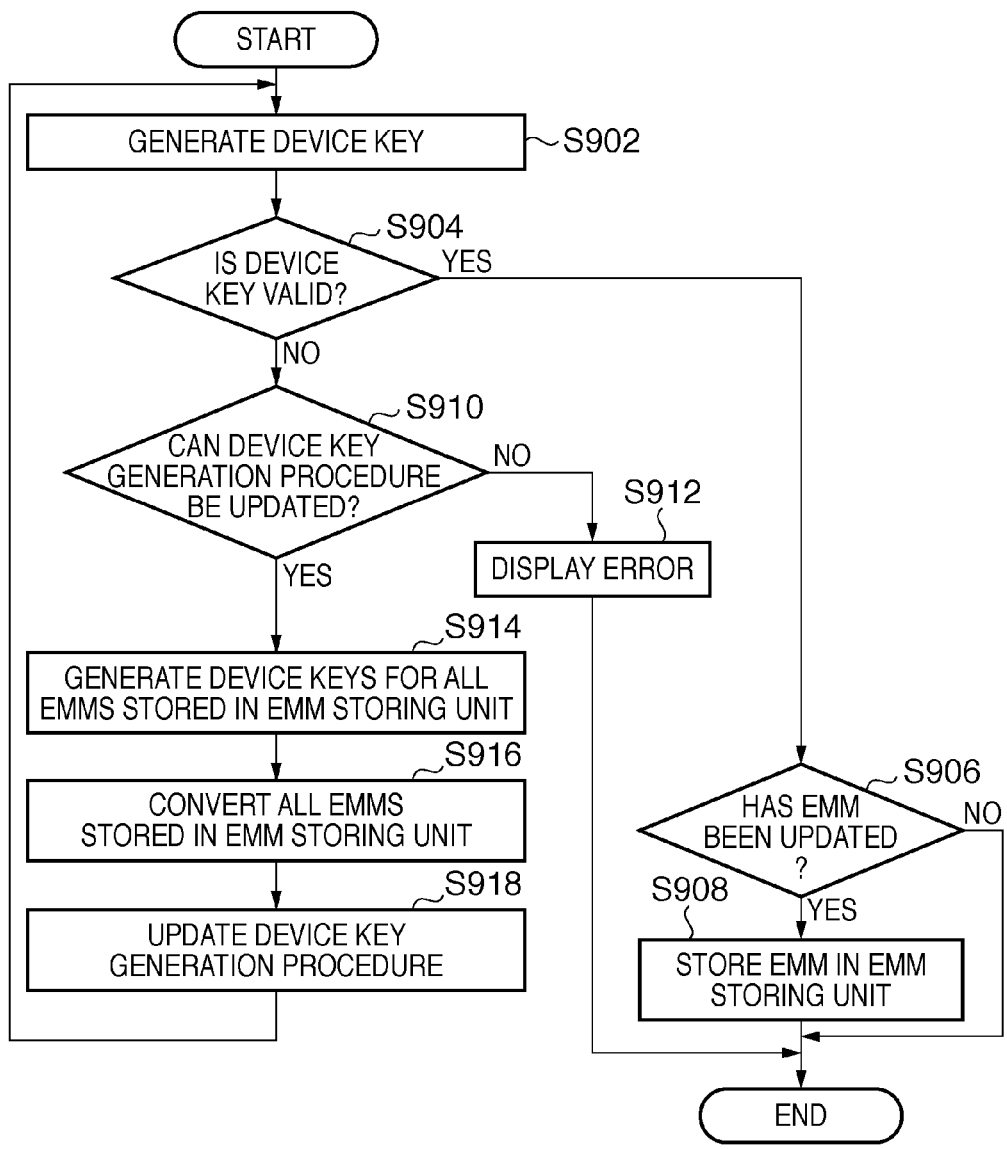
FIG. 9 is a flow chart for describing an operation for generating a device key and an operation for updating a device key generation procedure in the third embodiment.

First, an operation for generating a device key, and an operation for updating a device key generation procedure are described with reference to FIG. 9.

In step S902, the device key generation unit 203 generates a device key by applying a device key generation procedure to an EMM input from the EMM extraction unit 202 via the EMM storing unit 801.

In step S904, the device key determination/selection unit 205 determines whether or not the device key generated in step S902 is valid.

In step S904, if it is determined that the device key is valid, the processing proceeds to step S906.

In step S906, the device key determination/selection unit 205 determines whether or not an EMM from which the device key determined as being valid in step S904 is generated has been updated (that is, whether or not the EMM is a new EMM). Specifically, the device key determination/selection unit 205 determines whether or not the EMM has been updated by referencing device key update information included in the EMM. However, the device key determination/selection unit 205 may determine whether or not an EMM has been updated by comparing it with an EMM from which a device key was generated and used for descrambling in the past.

If it is determined that the EMM has been updated in step S906, the processing proceeds to step S908. On the other hand, if it is determined that the EMM has not been updated in step S906, since this EMM has already been stored in the EMM storing unit 801, the operation ends.

In step S908, the EMM storing unit 801 stores the EMM determined as having been updated in step S906, and the operation ends.

On the other hand, if it is determined that a device key is not valid (that is, a device key is invalid) in step S904, a device key generation procedure may have been updated, and thus the processing proceeds to step S910.

In step S910, the device key generation procedure updating unit 112 determines whether or not a device key generation procedure can be updated. If it is determined that a device key generation procedure cannot be updated, a message indicating that a device key generation procedure cannot be updated, that is, a device key necessary for descrambling cannot be generated (an error) is displayed on the monitor 107 in step S912, and the operation ends. On the other hand, if it is determined that a device key generation procedure can be updated, the processing proceeds to step S914.

In step S914, the device key generation unit 203 generates device keys by applying a device key generation procedure from before the update to all the EMMs stored in the EMM storing unit 801. Note that the device keys generated in step S914 are temporarily stored in the EMM storing unit 801.

In step S916, the EMM conversion unit 802 converts all the EMMs stored in the EMM storing unit 801, such that the same device key as the device key generated in step S914 is generated when the device key generation procedure from after the update is applied. In other words, the EMM conversion unit 802 generates EMMs corresponding to the device key generation procedure from after the update from the device key generated in step S914. Note that the EMMs converted in step S916 are overwrite-stored in the EMM storing unit 801.

In step S918, the device key generation procedure updating unit 112 updates a device key generation procedure, and the processing returns to step S902.

Figure 10:
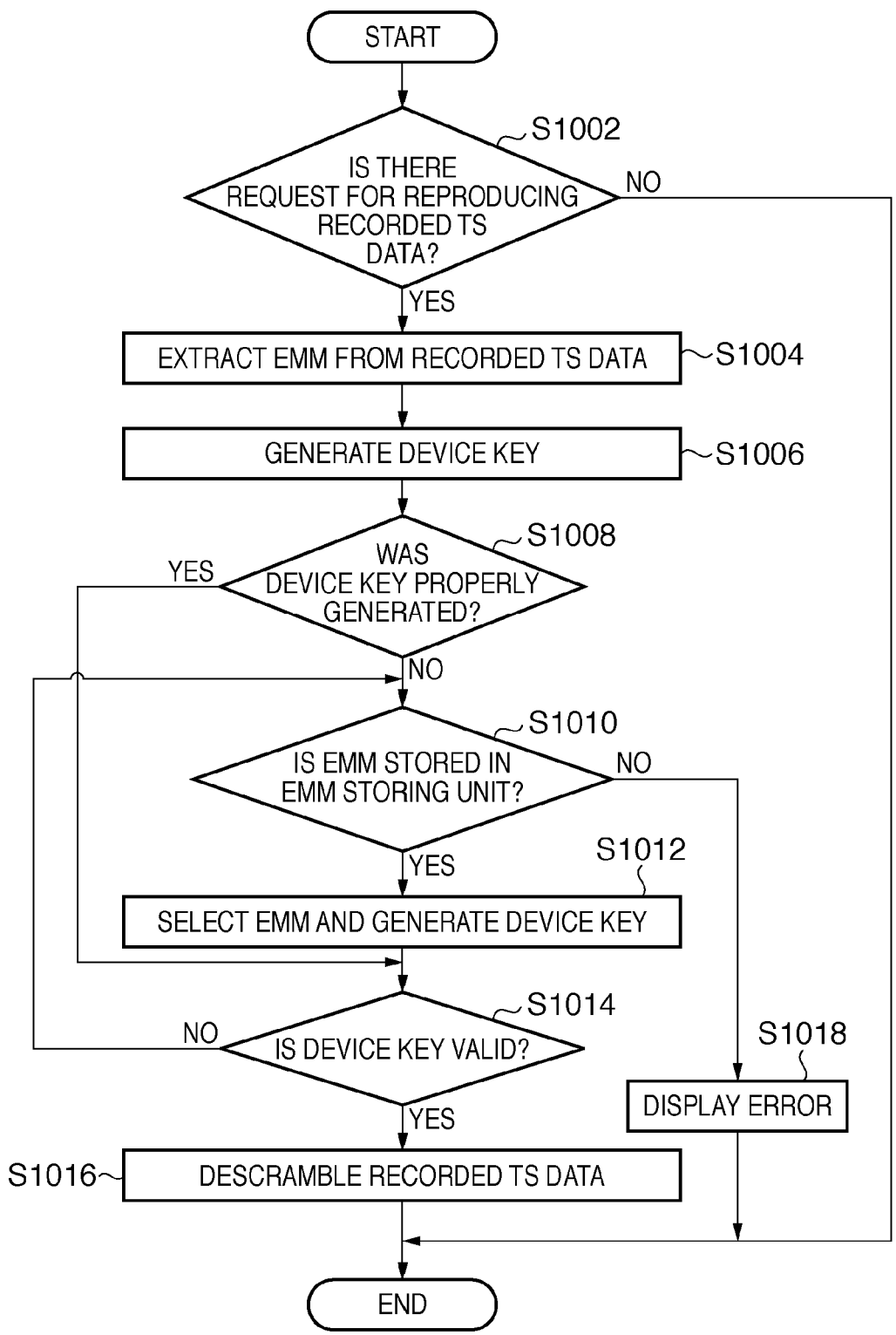
FIG. 10 is a flow chart for describing an operation for reproducing recorded TS data in the third embodiment.

Next, an operation for reproducing recorded TS data is described with reference to FIG. 10.

Since steps S1002 to S1008 are the same as steps S402 to 5408 in FIG. 4 described in the first embodiment, description thereof is omitted here.

In step S1010, the device key determination/selection unit 205 determines whether or not an EMM is stored in the EMM storing unit 801. If it is determined that an EMM is not stored in the EMM storing unit 801, a message indicating that a device key necessary for descrambling recorded TS data cannot be generated (an error) is displayed on the monitor 107 in step S1018, and the operation ends. On the other hand, if it is determined that an EMM is stored in the EMM storing unit 801, the processing proceeds to step S1012.

In step S1012, the device key generation unit 203 selects one EMM from EMMs stored in the EMM storing unit 801, and generates a device key by applying a device key generation procedure from after the update to that EMM.

In step S1014, the device key determination/selection unit 205 determines whether or not the device key generated in step S1012 is valid. If it is determined that the device key is not valid, the processing returns to step S1010 in order to search for an EMM from which a valid device key can be generated, from EMMs stored in the EMM storing unit 801. If it is determined that the device key is valid, the processing proceeds to step S1016.

In step S1016, the descrambling unit 104 descrambles recorded TS data using a scrambling key decrypted by at least using the device key determined as being valid in step S1014.

Thus, in the present embodiment, in the case where it is impossible to descramble recorded TS data using the device key generated from the recorded TS data when the data is to be reproduced, a device key is generated by applying the device key generation procedure from after the update to an EMM stored in the EMM storing unit 801. Then, the recorded TS data is descrambled using the device key generated by applying the device key generation procedure from after the update. Therefore, with the receiving apparatus 1 in the present embodiment, even after a device key generation procedure has been updated, without compromising the security of copyright protection, it is possible to view recorded TS data stored before the device key generation procedure was updated.

Note that, in the first embodiment, since a device key generated by the device key generation unit 203 is directly stored in the device key storing unit 204, a device key may be read without authorization. On the other hand, in the present embodiment, a device key is not directly stored, and an EMM corresponding to a device key generation procedure from after the update is stored, similar to the second embodiment, and thus it is possible to improve security (an effect of preventing a device key from being leaked) compared with the first embodiment.

Further, in the present embodiment, device keys are generated by sequentially selecting EMMs stored in the EMM storing unit 801, and it is determined whether or not recorded TS data can be descrambled (whether or not the device key is valid). However, when an EMM is stored, if a table showing the correspondence between that EMM and recorded TS data is stored in the EMM storing unit 801, it is possible to skip a step for determining whether or not the device key is valid. In this case, the device key generation unit 203 generates a device key by applying a device key generation procedure from after the update to an EMM shown in that table, according to recorded TS data to be reproduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2008-291496 filed on Nov. 13, 2008, which is hereby incorporated by reference herein in its entirety.

What is claimed is:

1. A receiving apparatus, comprising:
   a receiving unit configured to receive a digital broadcast signal including a scrambled broadcast signal, information for generating a device key, an encrypted work key, and an encrypted scrambling key, in a transport stream format;
   a device key generating unit configured to generate a device key by obtaining the information for generating the device key from the transport stream and applying a device key generation procedure that has been stored in advance in the receiving apparatus;
   a work key generating unit configured to obtain the encrypted work key from the transport stream, decrypt the encrypted work key using the device key generated by the device key generating unit, and generate a work key;
   a scrambling key generating unit configured to obtain the encrypted scrambling key from the transport stream, decrypt the encrypted scrambling key using the work key generated by the work key generating unit, and generate a scrambling key;
   a descrambling unit configured to descramble the scrambled broadcast signal using the scrambling key generated by the scrambling key generating unit;
   a device key storing unit configured to sequentially store the device key generated by the device key generating unit, every time the device key is updated; and
   a recording unit configured to store the digital broadcast signal in the transport stream format,
   wherein in a case where the device key generating unit cannot generate, from the stored transport stream, a device key necessary for descrambling the stored transport stream when the transport stream stored by the recording unit is to be reproduced,
   the work key generating unit decrypts the encrypted work key that is obtained from the stored transport stream, using the device key stored in the device key storing unit, and generates a work key.

2. The receiving apparatus according to claim 1, further comprising a determination unit configured to, in the case where the device key generating unit cannot generate, from the stored transport stream, the device key necessary for descrambling the stored transport stream when the transport stream stored by the recording unit is to be reproduced, determine whether or not the device key stored in the device key storing unit is a valid device key for descrambling the stored transport stream,
   wherein the work key generating unit decrypts the encrypted work key that is obtained from the stored transport stream, using the device key determined as being valid by the determination unit, and generates a work key.

3. The receiving apparatus according to claim 1,
   wherein when storing a device key generated by the device key generating unit, the device key storing unit further stores a table showing a correspondence between the device key and a transport stream stored by the recording unit, and
   in the case where the device key generating unit cannot generate, from the stored transport stream, the device key necessary for descrambling the stored transport stream when the transport stream stored by the recording unit is to be reproduced,
   the work key generating unit specifies a device key corresponding to the stored transport stream based on the table, decrypts the encrypted work key that is obtained from the stored transport stream, using the specified device key, and generates a work key.

4. A receiving apparatus, comprising:
a receiving unit configured to receive a digital broadcast signal including a scrambled broadcast signal, information for generating a device key, an encrypted work key, and an encrypted scrambling key, in a transport stream format;
a device key generating unit configured to generate a device key by obtaining the information for generating the device key from the transport stream and applying a device key generation procedure that has been stored in advance in the receiving apparatus;
a work key generating unit configured to obtain the encrypted work key from the transport stream, decrypt the encrypted work key using the device key generated by the device key generating unit, and generate a work key;
a scrambling key generating unit configured to obtain the encrypted scrambling key from the transport stream, decrypt the encrypted scrambling key using the work key generated by the work key generating unit, and generate a scrambling key;
a descrambling unit configured to descramble the scrambled broadcast signal using the scrambling key generated by the scrambling key generating unit;
a generation procedure storing unit configured to, when the device key generation procedure that has been stored in advance in the receiving apparatus is updated, store the device key generation procedure from before the update; and
a recording unit configured to store the digital broadcast signal in the transport stream format,
wherein in a case where the device key generating unit cannot generate, from the stored transport stream even by applying the device key generation procedure from after the update, a device key necessary for descrambling the stored transport stream when the transport stream stored by the recording unit is to be reproduced,
the device key generating unit generates a device key from the stored transport stream by applying the device key generation procedure from before the update stored by the generation procedure storing unit.

5. The receiving apparatus according to claim 4, further comprising a determination unit configured to, in the case where the device key generating unit cannot generate, from the stored transport stream even by applying the device key generation procedure from after the update, the device key necessary for descrambling the stored transport stream when the transport stream stored by the recording unit is to be reproduced, determine whether or not the device key that the device key generating unit generated by the generation procedure storing unit applying the device key generation procedure from before the update stored by the generation procedure storing unit is a device key valid for descrambling the stored transport stream,
wherein the work key generating unit decrypts the encrypted work key that is obtained from the stored transport stream, using the device key determined as being valid by the determination unit, and generates a work key.

6. The receiving apparatus according to claim 4,
wherein when storing the device key generation procedure from before the update, the generation procedure storing unit further stores a table showing a correspondence between the device key generation procedure from before the update and the transport stream stored by the recording unit, and in the case where the device key generating unit cannot generate, from the stored transport stream even by applying the device key generation procedure from after the update, the device key necessary for descrambling the stored transport stream when the transport stream stored by the recording unit is to be reproduced,
the device key generating unit specifies the device key generation procedure from before the update corresponding to the stored transport stream based on the table, and generates a device key by applying the specified device key generation procedure from before the update.

7. A receiving apparatus, comprising:
a receiving unit configured to receive a digital broadcast signal including a scrambled broadcast signal, information for generating a device key, an encrypted work key, and an encrypted scrambling key, in a transport stream format;
a device key generating unit configured to generate a device key by obtaining the information for generating the device key from the transport stream and applying a device key generation procedure that has been stored in advance in the receiving apparatus;
a work key generating unit configured to obtain the encrypted work key from the transport stream, decrypt the encrypted work key using the device key generated by the device key generating unit, and generate a work key;
a scrambling key generating unit configured to obtain the encrypted scrambling key from the transport stream, decrypt the encrypted scrambling key using the work key generated by the work key generating unit, and generate a srambling key;
a descrambling unit configured to descramble the scrambled broadcast signal using the scrambling key generated by the scrambling key generating unit;
a recording unit configured to store the digital broadcast signal in the transport stream format;
a storing unit configured to sequentially store the information for generating the device key, every time the information for generating a device key is updated; and
a conversion unit configured to convert the information for generating the device key stored by the storing unit when the device key generation procedure is updated, such that a same device key as the device key generated by applying the device key generation procedure from before the update is generated when the device key generation procedure from after the update is applied, and causes the storing unit to store the converted information,
wherein in a case where the device key generating unit cannot generate, from the stored transport stream even by applying the device key generation procedure from after the update, a device key necessary for descrambling the stored transport stream when the transport stream stored by the recording unit is to be reproduced,
the device key generating unit applies the device key generation procedure from after the update to the information for generating the device key that is stored by the storing unit and has been converted by the conversion unit, and generates a device key.

8. The receiving apparatus according to claim 7, further comprising a determination unit configured to, in the case where the device key generating unit cannot generate, from the stored transport stream even by applying the device key generation procedure from after the update, the device key necessary for descrambling the stored transport stream when the transport stream stored by the recording unit is to be reproduced, determine whether or not the device key that the device key generating unit generated by applying the device key generation procedure from after the update to the information for generating the device key that is stored by the storing unit and has been converted by the conversion unit is a valid device key for descrambling the stored transport stream,
- wherein the work key generating unit decrypts the encrypted work key that is obtained from the stored transport stream, using the device key determined as being valid by the determination unit, and generates a work key.

9. The receiving apparatus according to claim 7,
- wherein when storing the information for generating the device key, the storing unit further stores a table showing a correspondence between the information for generating the device key and the transport stream stored by the recording unit, and
- in the case where the device key generating unit cannot generate, from the stored transport stream even by applying the device key generation procedure from after the update, the device key necessary for descrambling the stored transport stream when the transport stream stored by the recording unit is to be reproduced,
- the device key generating unit specifies the information for generating the device key stored by the storing unit corresponding to the stored transport stream based on the table, and applies the device key generation procedure from after the update to the specified information for generating the device key, and generates a device key.

10. A method for controlling a receiving apparatus, the method comprising:
- a receiving step of receiving a digital broadcast signal including a scrambled broadcast signal, information for generating a device key, an encrypted work key, and an encrypted scrambling key, in a transport stream format;
- a device key generating step of generating a device key by obtaining the information for generating the device key from the transport stream and applying a device key generation procedure that has been stored in advance in the receiving apparatus;
- a work key generating step of obtaining the encrypted work key from the transport stream, decrypting the encrypted work key using the device key generated in the device key generating step, and generating a work key;
- a scrambling key generating step of obtaining the encrypted scrambling key from the transport stream, decrypting the encrypted scrambling key using the work key generated in the work key generating step, and generating a scrambling key;
- a descrambling step of descrambling the scrambled broadcast signal using the scrambling key generated in the scrambling key generating step;
- a device key storing step of sequentially storing, in a device key storing unit, the device key generated in the device key generating step, every time the device key is updated; and
- a recording step of storing the digital broadcast signal in the transport stream format,
- wherein in a case where a device key necessary for descrambling the stored transport stream cannot be generated from the stored transport stream in the device key generating step, when the transport stream stored in the recording step is to be reproduced,
- in the work key generating step, the encrypted work key that is obtained from the stored transport stream is decrypted using the device key stored in the device key storing unit, and a work key is generated.

11. A method for controlling a receiving apparatus, the method comprising:
- a receiving step of receiving a digital broadcast signal including a scrambled broadcast signal, information for generating a device key, an encrypted work key, and an encrypted scrambling key, in a transport stream format;
- a device key generating step of generating a device key by obtaining the information for generating the device key from the transport stream and applying a device key generation procedure that has been stored in advance in the receiving apparatus;
- a work key generating step of obtaining the encrypted work key from the transport stream, decrypting the encrypted work key using the device key generated in the device key generating step, and generating a work key;
- a scrambling key generating step of obtaining the encrypted scrambling key from the transport stream, decrypting the encrypted scrambling key using the work key generated in the work key generating step, and generating a scrambling key;
- a descrambling step of descrambling the scrambled broadcast signal using the scrambling key generated in the scrambling key generating step;
- a generation procedure storing step of, when the device key generation procedure that has been stored in advance in the receiving apparatus is updated, storing, in a generation procedure storing unit, the device key generation procedure from before the update; and
- a recording step of storing the digital broadcast signal in the transport stream format,
- wherein in a case where a device key necessary for descrambling the stored transport stream cannot be generated from the stored transport stream even by applying the device key generation procedure from after the update in the device key generating step, when the transport stream stored in the recording step is to be reproduced,
- in the device key generating step, a device key is generated from the stored transport stream by applying the device key generation procedure from before the update stored by the generation procedure storing unit.

12. A method for controlling a receiving apparatus, the method comprising:
- a receiving step of receiving a digital broadcast signal including a scrambled broadcast signal, information for generating a device key, an encrypted work key, and an encrypted scrambling key, in a transport stream format;
- a device key generating step of generating a device key by obtaining the information for generating the device key from the transport stream and applying a device key generation procedure that has been stored in advance in the receiving apparatus;
- a work key generating step of obtaining the encrypted work key from the transport stream, decrypting the encrypted work key using the device key generated in the device key generating step, and generating a work key;
- a scrambling key generating step of obtaining the encrypted scrambling key from the transport stream, decrypting the encrypted scrambling key using the work key generated in the work key generating step, and generating a scrambling key;
- a descrambling step of descrambling the scrambled broadcast signal using the scrambling key generated in the scrambling key generating step;

a recording step of storing the digital broadcast signal in the transport stream format;

a storing step of sequentially storing, in a storing unit, the information for generating the device key, every time the information for generating a device key is updated; and a conversion step of converting the information for generating the device key stored in the storing unit when the device key generation procedure is updated, such that a same device key as the device key generated by applying the device key generation procedure from before the update is generated when the device key generation procedure from after the update is applied, and causing the storing unit to store the converted information, wherein in a case where a device key necessary for descrambling the stored transport stream cannot be generated from the stored transport stream even by applying the device key generation procedure from after the update in the device key generating step, when the transport stream stored in the recording step is to be reproduced, in the device key generating step, the device key generation procedure from after the update is applied to the information for generating the device key that is stored in the storing unit and has been converted in the conversion step, and a device key is generated.

* * * * *